United States Patent [19]

Cobb

[11] 4,241,700
[45] Dec. 30, 1980

[54] METHOD AND APPARATUS FOR SIMULTANEOUS DISTRIBUTION OF POULTRY FEED

[76] Inventor: Richard H. Cobb, Rte. 4, Box 330RC, Hope, Ark. 71801

[21] Appl. No.: 5,028

[22] Filed: Jan. 19, 1979

[51] Int. Cl.³ .......................... A01K 5/00; A01K 5/02
[52] U.S. Cl. ............................. 119/52 AF; 119/56 R
[58] Field of Search ............. 119/52 AF, 51.11, 56 R, 119/53

[56] References Cited

U.S. PATENT DOCUMENTS

| | | | |
|---|---|---|---|
| 3,180,318 | 4/1965 | Fisher | 119/56 R |
| 3,211,339 | 10/1965 | Piper et al. | 119/56 R X |
| 3,485,215 | 12/1969 | Scott et al. | 119/52 AF |
| 3,502,053 | 3/1970 | Geerlings | 119/56 R |
| 3,971,340 | 7/1976 | Allen | 119/52 AF |

Primary Examiner—Hugh R. Chamblee

[57] ABSTRACT

An improved method and apparatus are disclosed for dispensing feed from a storage hopper to a closed-loop trough for simultaneous distribution of the feed to selectively positioned feed stations. A conveyor in the trough is used for displacing the feed from the storage hopper along the length of the trough to dispensing openings over the feed stations which are maintained covered by suitable means such as a sliding cutoff until feed is distributed uniformly throughout the trough. The openings are then uncovered in concert to simultaneously distribute feed from the trough to the feed stations.

8 Claims, 8 Drawing Figures

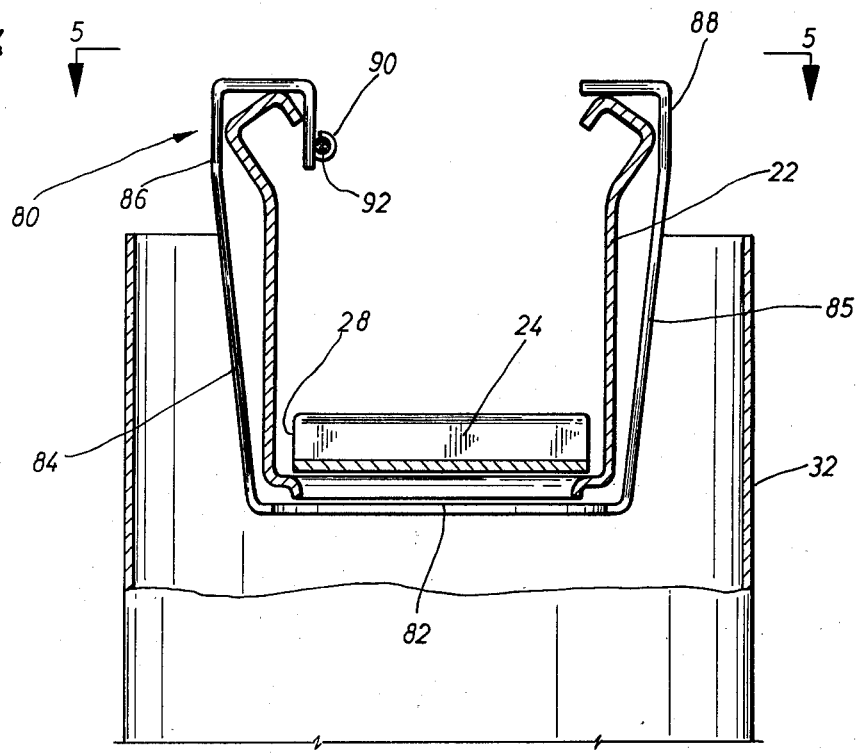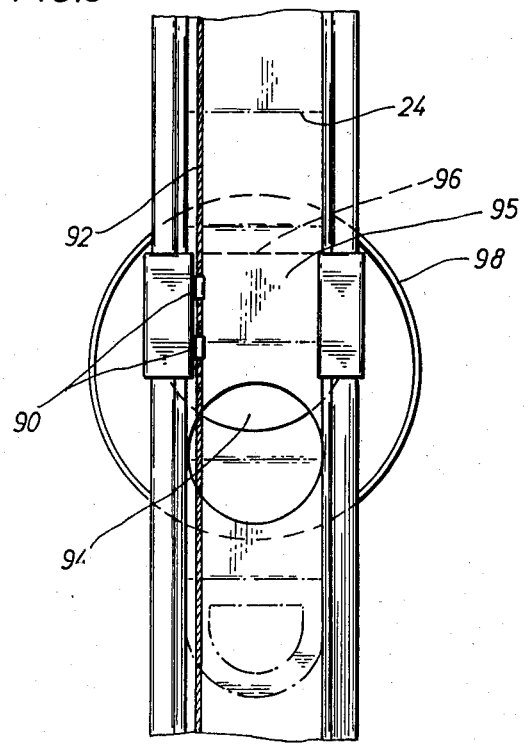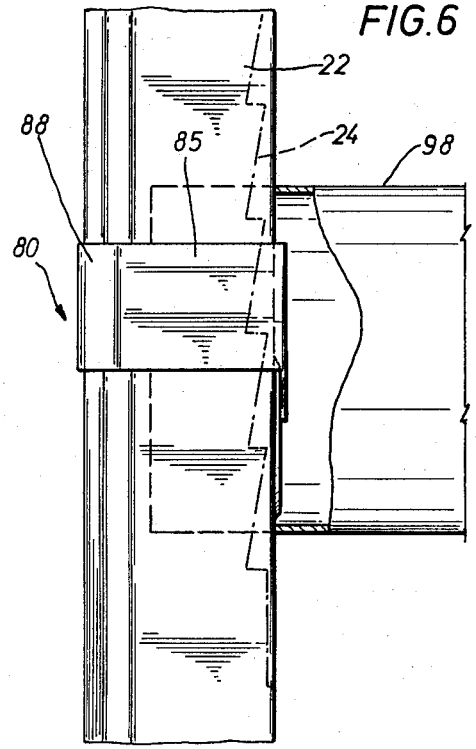

METHOD AND APPARATUS FOR SIMULTANEOUS DISTRIBUTION OF POULTRY FEED

BACKGROUND OF THE INVENTION

1. Field of the Invention

The invention relates generally to a feed system and more particularly, it concerns an improved poultry feed system for dispensing feed from a feed source to selectively positioned feed stations throughout the poultry house for simultaneous distribution.

2. Description of Prior Art

The use of automated poultry feeders is a relatively recent development. The system employed before their appearance involved manually carrying the feed to the pens to be fed to a limited number of fowl. While this method enabled the poultry producer to limit the number of birds competing for a given quantity of feed, the number of man hours required made it prohibitive. Therefore most poultry producers, today, distribute feed automatically throughout an entire poultry house by means of mechanized feeders.

Perhaps the most advanced of such mechanized feeders is the standard chain trough feeder. The chain trough feeder often includes a channel shaped trough arranged in a closed loop extending throughout the poultry house and a conveyor chain, located in the bottom of the trough, to move feed along its length throughout the closed loop. The birds then feed directly from the trough as it circulates feed.

A variation of this chain trough feeder is represented by the Cumberland Auto-Pan Feeder. This feeder requires that feed-drop holes be added in the bottom of the trough at selective locations. Drop tubes and pans are then placed under these holes and the feed falls in these pans as it is circulated in the trough. Accordingly, the birds feed directly from the pans.

While standard chain trough feeders and variations such as the Cumberland Autopan Feeder provide the advantage of reducing manual effort, they do suffer the following disadvantages:

First, since the nature of the standard chain trough feeder is such that feed is first provided either at the first open section of the trough away from the feed source or at the first pan feeder, severe crowding occurs at this feed entry point during the first ten to fifteen minutes of feeding. This crowding may be extreme, resulting in a significant loss of birds due to trampling and smothering. Moreover, a mechanical failure during this period can result in increased losses, due to continued crowding until the malfunction is corrected.

Secondly, there is a high level of competition for the available feed which results in broad variations of body weight. In restricted feeding applications such as the raising of breeder hens, such variations are unsatisfactory. Rather, the desired result is to maintain a uniform weight among the birds by providing a small, but equal portion of feed per bird per day.

Finally, since the chain draws feed past every opening, there is a tendency for the finer particles of feed to drop into the earlier pan feeders and for the coarser feed particles to circulate to the most distant pan feeders. This feed particle separation is especially disadvantageous because the variation in the size of the ingredients is often due to a difference in the ingredients, themselves. This system, therefore, often causes only certain ingredients of the feed to be available at the most distant stations.

Hence, to provide an improved feed system, it is necessary to provide a system which simultaneously distributes feed to the feed stations throughout the poultry house without separating feed ingredients.

SUMMARY OF THE INVENTION

The present invention overcomes the prior art disadvantages through a feed system which includes a feed source and a closed-loop trough adjacent to and extending from the feed source through a feed area in communication with a plurality of feed stations. A conveyor in the trough displaces feed from the feed source along the length of the trough throughout the feed area. Dispensing openings in the trough overlie each of the feed stations and closure means are provided to selectively and simultaneously cover and to selectively and simultaneously uncover each of the dispensing openings, in order to prevent the dispensing of feed to said stations while the conveyor distributes feed past the openings and throughout the trough and then to dispense essentially identical amounts of feed to the stations.

In the preferred embodiment, the closure means includes a cutoff slide member movably attached below each of the dispensing openings. The preferred embodiment further comprises power means for simultaneously displacing the slide members to cover and uncover the openings and communicating means interconnected with the slide members and the power means to transmit displacement actuation from the power means to the slide members to effect selective and simultaneous movement of the slide members.

In a more preferred embodiment, the system comprises a means of biasing the cutoff slide members in a normally closed position.

In the most preferred embodiment, the communicating means between the slide members and the power means includes at least one cable tautly secured to the slide members. The biasing means includes a spring secured, in tension, to one end of the cable and the power means includes a solenoid in communication with the cable so that movement of the solenoid effects lateral displacement of the cable thereby resulting in the simultaneous motion of all slide members connected thereto.

The most preferred embodiment further comprises a microswitch for sensing the level of the feed in the trough and for actuating the solenoid when the desired feed level is obtained. A time delay relay then disengages the solenoid after sufficient time has passed to allow dispensing of the feed from the trough to the feed station.

The instant invention also provides a novel method of depositing poultry feed at a plurality of selectively positioned feed stations within the poultry house by dispensing the poultry feed into a closed-loop trough from a feed source. Then, the poultry feed is conveyed along the feed trough from the point of dispensing past the different feed stations without depositing feed at those stations to achieve an essentially uniform distribution of feed in the trough along the length of the closed loop. Thereafter essentially identical amounts of feed are simultaneously deposited from the trough to the plurality of feed stations.

In a preferred aspect of the method, the trough includes openings along its length positioned over the various feed stations. The operation of the trough is characterized by maintaining the openings covered during the performance of conveying the poultry feed along the feed trough from the point of dispensing throughout the trough to achieve essentially uniform distribution of the feed in the trough along the length of the closed loop and then uncovering the openings during the depositing of the essentially identical amounts of feed into the feed stations.

In the most preferred method, the conveying chain continues operation during the performance of the depositing of the amounts at the feed stations in order to convey the feed located between the openings to the openings for depositing at the feed stations.

The instant invention additionally provides a method of depositing a predetermined quantity of poultry feed from the feed source to a plurality of selectively positioned feed stations within the poultry house in essentially uniform amounts. This is accomplished by dispensing only a portion of the predetermined quantity of poultry feed from the feed source into the trough, then conveying the feed along the trough as previously described and depositing essentially identical amounts of feed to the various feed stations. Once the amount of the feed in the trough has diminished below a selective level, the depositing of the feed into the feed stations is then terminated so that the trough may refill. This process of filling the trough and emptying it into the feed stations is sequentially repeated until the predetermined quantity of poultry feed is dispensed from the feed source. Preferably, this aspect of the method is accomplished by maintaining the openings in the trough covered during the distribution of feed in the trough along the length of the closed loop, uncovering the openings to accommodate the depositing of the feed into the feed stations, and again closing the openings to terminate the depositing of the feed.

In the most preferred embodiment of the instant invention, the feed source contains a microswitch which is designed to open upon emptying of the feed source of the predetermined quantity of poultry feed. Upon opening the microswitch, the entire feed system will cease operation.

Accordingly the present invention overcomes the previously discussed problems of nonuniform feed distribution and has the additional advantages over the prior art of causing less feeder wear and power consumption because the recirculation of feed will be minimized by this system.

BRIEF DESCRIPTION OF THE DRAWINGS

This invention will further be illustrated by reference to the appended drawings which illustrate a particular embodiment of the device for simultaneous distribution of poultry feed in accordance with this invention.

FIG. 4 is a view similar to FIG. 2, but illustrating an alternative embodiment of the cutoff slide member in place on the trough.

FIG. 5 is a top view of the alternative embodiment of the cutoff slide member in the open position.

FIG. 6 is a side cut-away view showing the cutoff slide in position on the trough within the drop tube.

DESCRIPTION OF THE PREFERRED EMBODIMENTS

Figure 1:
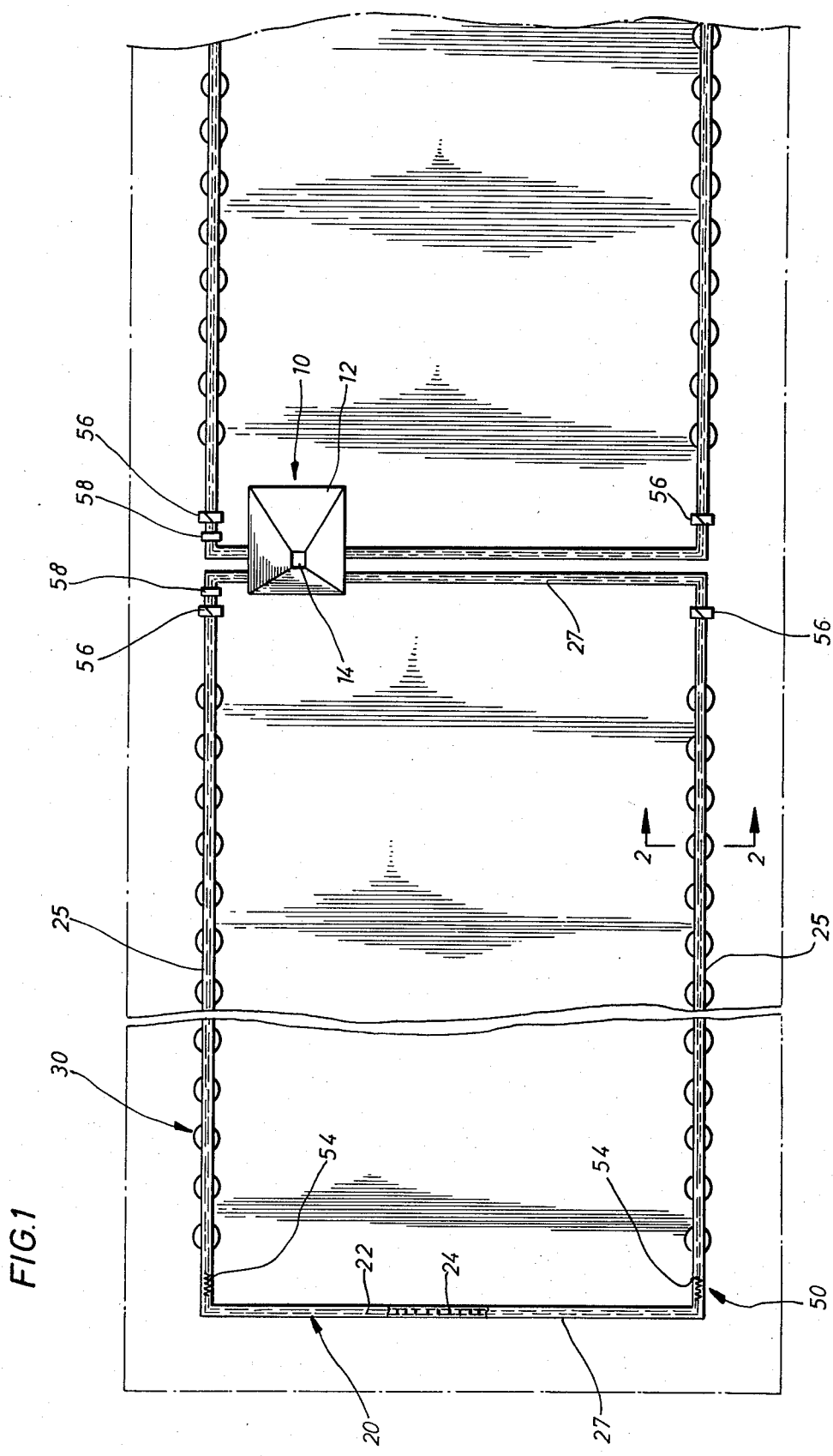
FIG. 1 is a schematic view of the feed system as located within the poultry house.

The preferred embodiment is generally represented by a feed source 10, a closed loop conveying means 20, feed stations 30, feed cutoff assembly 40, and interconnecting cable system 50.

Referring to FIG. 1, the feed source 10 is comprised of a feed hopper 12 and a feed hopper microswitch 14 (shown diagrammatically). The feed hopper 12 consists of any one of a number of suitable feed hoppers presently available in the market for distributing feed from a bin into a trough. The feed hopper microswitch 14 is affixed at the dispensing point of feed hopper 12 such that the microswitch 14 will open once the feed within the feed hopper is essentially dispensed. The opening of the feed hopper microswitch 14 then shuts down the entire system in a method that will be described below. The feed hopper microswitch may consist of any of a number of commercially available microswitches which are pressure sensitive and which will open upon the removal of pressure.

FIG. 1 illustrates two independent closed-loop conveying means 20 associated with a single feed hopper 12. These loops may be essentially identical and therefore the description will be limited to a single loop.

Figure 2:
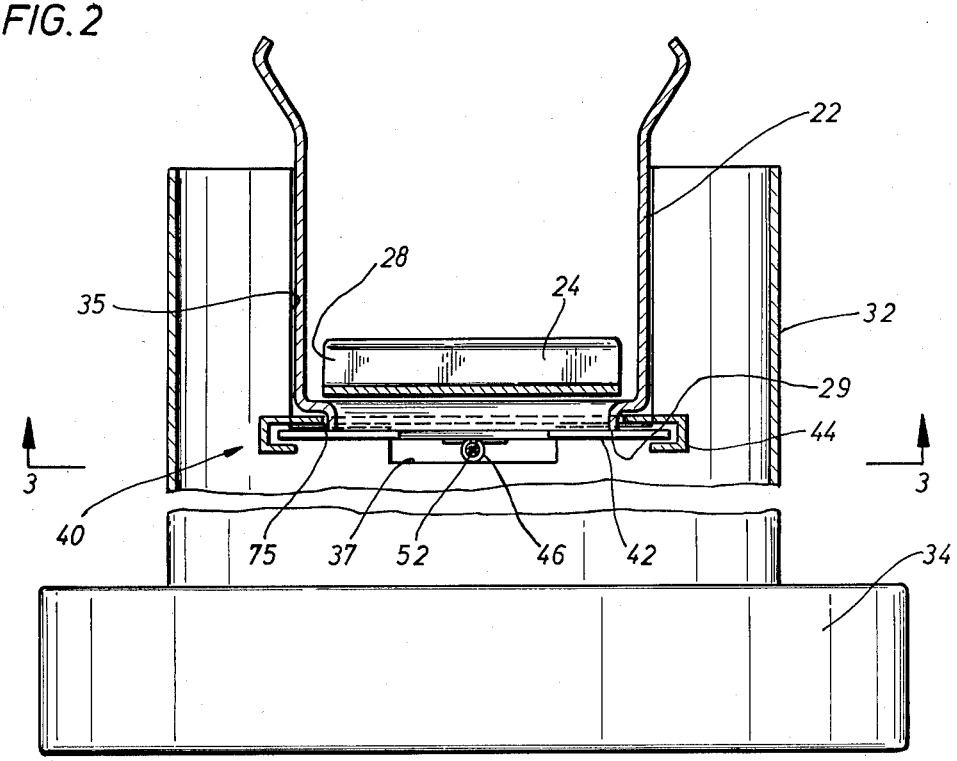
FIG. 2 is a cross sectional view taken along a vertical plane to illustrate the trough, drop tube and pan assembly with a cutoff slide member in place.

The closed loop conveying means 20 comprises a trough 22, a conveying chain 24, and a plurality of dispensing openings 26. In the preferred embodiment, the trough 22 is comprised of a channel-shaped member arranged horizontally in a rectangular closed loop and includes two length sections 25 and two width sections 27. Dispensing openings 26 are provided in the bottom of the trough at selective locations along the two length sections 25 of the rectangular loop and include a downwardly turned lip 29 as shown in FIG. 2. In order to transport the feed, a conveyor chain 24 rides in the bottom of trough 22, the chain comprising an upraised member 28 to facilitate the displacement of the feed and openings (not shown) in the body of the chain to allow feed to drop through the chain to the dispensing openings 26 and into the feed stations 30. In the preferred embodiment, the closed loop conveying means consists essentially of a standard chain trough feeder. It will be appreciated by those skilled in the art that other suitable closed loop conveying means may be utilized in accordance with the present invention. Conventional power means (not shown) of any desired type may be provided to effect the displacement of the conveyor chain.

As shown in FIGS. 1 and 2, feed stations 30 are located below each of the dispensing openings 26 and comprise a drop tube 32, a feed pan 34, and a feed cutoff assembly 40. The drop tube 32 consists of a cylindrical sheet metal member or an injection molded plastic member which is wider in diameter than the width of the channel-shaped trough in order to catch all feed being dispensed from the trough. The drop tube 32 includes cut-outs 35 in order to receive and support the slide support bracket 44 and cut-outs 37 in order to allow passage of the cable 52 and movement of the cutoff slide member 42. The feed pan 34 is securely fixed below the drop tube 32 such that feed may distribute from the drop tube 32 into the feed pan 34.

In the preferred construction, the drop tube pan assembly may consist of any suitable drop tube pan feeder modified for the cable and cutoff slide such as the Cumberland Auto-Pan Feeder. As should be apparent to those skilled in the art, other suitable pan assemblies may be utilized or the pan may be eliminated entirely, if desired.

Figure 3:
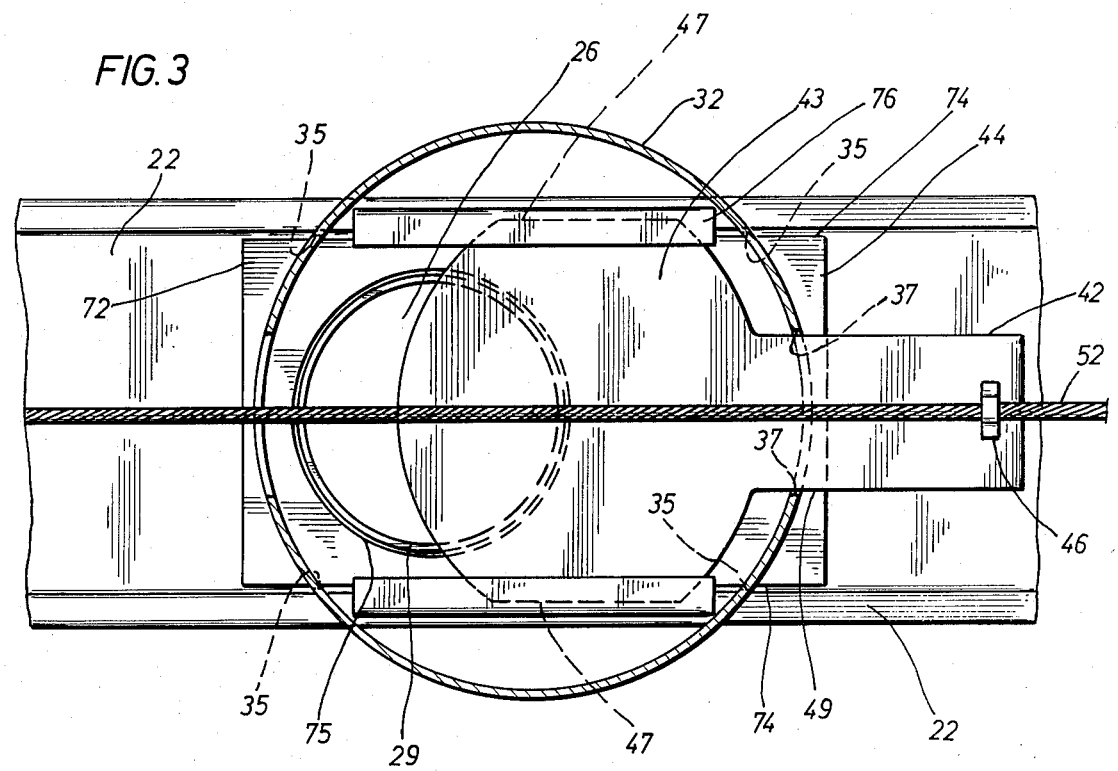
FIG. 3 is a bottom view of a feed station in place with the feed pan removed looking up the drop tube at the slide member in the partially opened position for illustrative purposes, this view being taken along plane 3—3 as shown in FIG. 2.

Referring now to FIGS. 2 and 3, the feed cutoff assembly 40 is comprised of a cutoff slide member 42, a slide support bracket 44, and a cable clamp 46. In order to support the movement of the slide member 42, the slide support bracket 44 is generally C-shaped in cross-section and, as shown in FIG. 3, includes a horizontal base 72, two support tabs 76, and a circular opening 75. The horizontal base 72 is essentially rectangular in shape and has a length 74 greater than the diameter of the drop tubes 32 in order to allow the horizontal base 72 to rest on the top of the drop tube cutouts 35. The two tabs 76 are essentially channel-shaped in cross section in order to support the movement of the slide member 42. The tabs 76 are secured by suitable means on the opposite lengths 74 of the base 72. As shown in FIG. 3, the length and width of the two channel-shaped tabs 76 are of sufficient dimension so that the tabs are circumscribed by the inner circumference of the drop tube 32. Hence, the channel-shaped tabs 76 will fit snugly into the drop tube 32 and serve to secure the support member 44 within the tube.

The diameter of the circular opening 75 should be slightly greater than the diameter of the dispensing openings 26 so that the circular opening 75 will fit snugly over the downwardly turned lip 29 of the dispensing opening 26. The fastening of the drop tube 32 to the trough 22 by conventional means in current use will then secure the drop tube 32 and the slide support member 44 in place.

It should be understood that the slide support member 44 may be formed either entirely as one piece or as three pieces which are secured by suitable means.

Referring to FIG. 3, the cutoff slide member consists of a main body 43 roughly circular in shape, containing two flats 47 on opposite sides in order to maintain the proper alignment of the slide within the slide support bracket. For the purpose of accommodating the cable clamp 46, a handle shaped extension 49 is connected to the main body of the slide support. The cable clamp 46 is then securely fastened to the end of this extension and is comprised of a ring which may be crimped in order to secure the cable.

Referring again to FIG. 1, the interconnecting cable system 50 is comprised of cables 52, springs 54, solenoids 56, feed level microswitch 58, and a feed level time delay relay (not shown). A cable 52 is positioned along each length section 25 of the rectangular closed loop and interconnected with each of the cutoff slide members located at the selected feed stations along the length. As shown in FIG. 2, the cable is securely fastened to each of the cutoff slide members by means of cable clamp 46 so that no slack is present between the selected feed stations. In order to bias the cutoff slide members 42 in the closed position, a spring 54 is attached to one end of each of the cables 52 in tension. In communication with the opposite end of each cable 52 is a solenoid 56. In operation, the actuation of solenoid 56 causes the displacement of cable 52 thereby moving the cutoff slide members to uncover the dispensing openings 26. When the solenoids are deactivated, the springs displace the cables to recover the openings.

In the preferred embodiment, one cable was utilized for every length of the rectangular closed loop. It should be appreciated by those skilled in the art, however, that through the appropriate use of pulleys, a single cable could be utilized for the entire loop.

A feed level microswitch 58 is secured at the most distant end of the closed loop conveying means 20 in terms of the direction of movement of the feed. The feed level microswitch 58 is located on the inner side of the trough 22 at a predetermined level so that the pressure exerted by the feed upon the microswitch will close the switch when the feed reaches the desired level. In operation, the closing of the switch will actuate the solenoids 56 to uncover the openings.

The feed level microswitch 58 is also in communication with the feed level time delay relay 60 so that closing the microswitch will also activate the operation of the feed level time delay relay 60. Upon the passage of the period of time provided for by the relay, the relay will then deactivate the solenoids 56, whereupon the biasing force from the spring 54 displaces the cables to re-cover the openings 26 in the trough by the slide members 42.

Accordingly, when the apparatus in the preferred embodiment is utilized, the cutoff slide members 42 are initially in the closed position as dictated by the bias on the cables 52 caused by the springs 54. To start operation, feed is dispensed from the feed hopper 12 into the trough 22. The conveyor chain 24 displaces and circulates the feed in a clockwise direction along the length of the trough 22 past the dispensing openings 26 until the feed reaches a uniform level at the most distant point of the closed loop as indicated by the location of the feed level microswitch 58. Once the feed reaches the predetermined uniform level in the trough 22, the feed level microswitch 58 will then close thereby actuating the solenoids 56. The actuation of the solenoids 56 in turn will displace the cables 52 so that the lateral displacement of the slide members 42 uncovers the dispensing openings 26. This allows feed to pass through the dispensing openings 26 down the drop tube 32 into the feed pan 34 where is available for consumption by the poultry. The conveyor chain 24 accordingly continues to displace feed from between the feed stations to the next station in the direction of travel where the feed is deposited through the uncovered openings. Feed is therefore deposited in essentially identical amounts to each of the feed stations as provided by the uniform level of feed in the trough prior to uncovering the openings and the continuous displacing of that feed by the conveyor chain.

After a predetermined length of time, the feed level time delay relay 60 will disconnect the solenoids 56. The period of time provided by the time delay relay 60 should be sufficient to allow depositing of essentially all the feed between the stations into the next station. Once the solenoid is deactivated, the biasing caused by the springs 54 will return the cables 52 to their initial positions thereby displacing the cutoff slide members 42 and covering the dispensing openings 26. This sequence of depositing feed into the trough 22 until it reaches a uniform level, uncovering the dispensing openings 26 to deposit feed, then covering the dispensing openings to allow refilling of the trough 22 may be repeated either for a given number of iterations or until a predetermined quantity of feed is dispensed from the feed hopper.

In the preferred embodiment the latter method of dispensing a predetermined quantity of feed is utilized. This is effected by the placing of the feed hopper microswitch 14 at the dispensing opening so that it will open when feed is no longer present in the hopper to be dispensed. The opening of the feed hopper microswitch 14 will then cutoff all power to the system thereby terminating the depositing of feed to the feed stations.

FIGS. 4-6 show an alternative embodiment of the feed cutoff assembly in place on the trough 22. In this embodiment, the cutoff slide assembly 80 is comprised of a one piece unitary sheet metal member having a horizontal base 82 of sufficient length to close the dispensing openings 26. In cross section, FIG. 4 shows outwardly flaring sides 84 and 85 extending upwardly from the base. Side 85 converges into an L-shaped support flange 88 and side 84 converges into a channel-shaped support flange 86 such that both support flanges rest upon the top edges of the trough 22. Secured to the inner side of the channel-shaped support flange is cable clamp 90 which may be crimped in order to secure the cable 92, serving the same purpose and function as cable 52 in the embodiment disclosed in FIGS. 1-3 except in a different location.

Referring to FIG. 5, the configuration of the horizontal base 82 is shown to be defined by an arcuate extension 94 which converges into a rectangular body 95 and includes a terminal end 96.

FIG. 6 illustrates a side view of the cutoff slide assembly 80 and, as shown, the sides 84 and 85 have a width less than the horizontal base 82. As will be understood, however, this feature is not critical and the sides could be the same length as the base such that the base would be rectangular and not include an arcuate extension.

The drop tube of this embodiment will include a cut-out (not shown) similar to that as shown and described by reference numeral 35 of the embodiment in FIGS. 1-3. Since the cable 92 of this embodiment is positioned within the trough 22, the drop tube will not necessarily require a cut-out similar to that as shown and described by reference numeral 37 in the previous embodiment.

The embodiment shown in FIGS. 4-6 may be preferable because a slide support member is not required.

Figure 7:
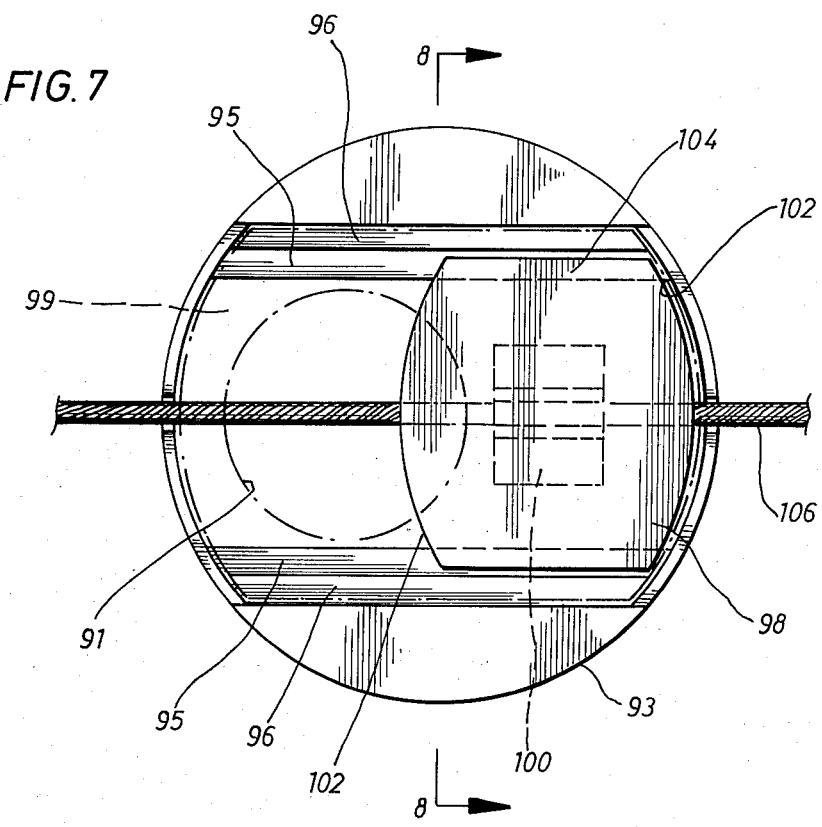
FIG. 7 is a top view of another alternative embodiment illustrating a cutoff slide and retainer in place in an injection molded drop tube with the trough omitted.
Figure 8:
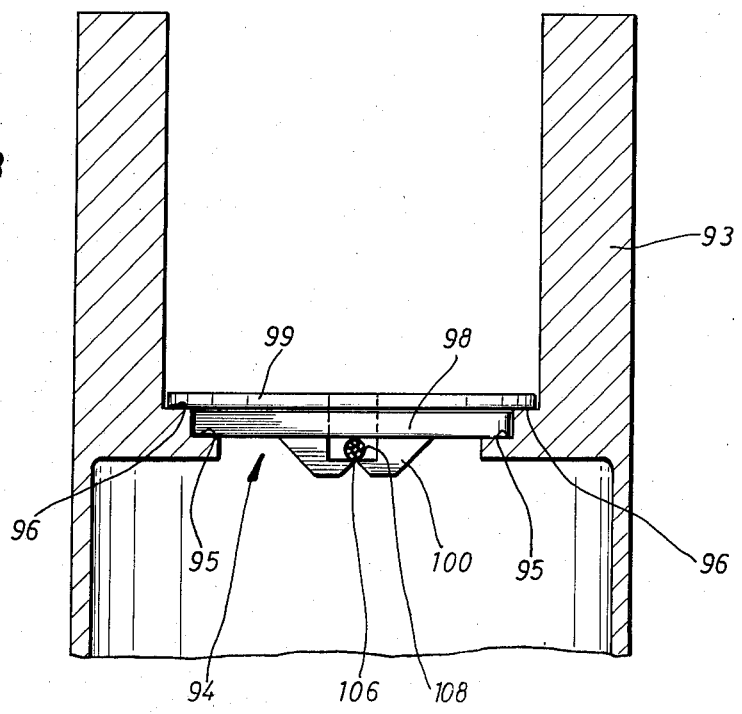
FIG. 8 is a cross sectional view taken along a vertical plane 7—7 to illustrate the cutoff slide and retainer in place in the drop tube.

FIGS. 7 and 8 show an additional alternative embodiment of the feed cutoff slide assembly 94 in place in an injection molded plastic drop tube 93. The trough is not shown in these figures for simplicity of explanation. In this embodiment, the cutoff slide assembly comprises a cutoff slide 98, slide retainer 99, and cable clamp 100.

The configuration of the cutoff slide 98 is shown to be defined by two arcuate extensions 102 which converge into a essentially rectangualar body 104.

As shown in FIGS. 7 and 8, the cable clamp 100 is secured to the bottom of cutoff slide 98 and is substantially centered on the slide. The shape of the clamp is defined in cross-section by a trapezoid with a V-shaped cutout in the lower base extending inwardly to a hole 108, the cutout providing access for the cable 106 to the hole. The diameter of the hole in the cable clamp 100 should be slightly less than the diameter of the cable 106 in order to ensure secure gripping of the cable by the clamp.

As illustrated in FIG. 8, the slide retainer 99 is located above the slide 98. Referring to FIG. 7, where the retainer is shown by ghost lines in order that the structure underneath may be more clearly shown, the outer configuration of the retainer is substantially similar to that of the cut-off slide 98, having two arcuate extensions which converge into an essentially rectangualar body. The retainer further includes a substantially circular opening 91 with a diameter slightly greater than the outer diameter of the dispensing opening of the trough so that the circular opening 91 will position snuggly around the downwardly turned lip (not shown) of the opening in the trough in the same manner as in the embodiment described in FIGS. 1-3. The fastening of drop tube 93 to the trough described in FIGS. 1-3 by conventional means in current use will then secure the drop tube and the cutoff slide assembly 94 in place on the trough.

Referring to both FIGS. 7 and 8, the drop tube 93 is comprised of a unitary plastic cylinder having molded in its interior walls two opposed cutoff slide support ledges 95, two opposed slide retainer support ledges 96 and further including cutouts (not shown) similar to those shown and described by reference numerals 35 and 37 of the embodiment in FIGS. 1-3.

As shown in FIG. 8, cutoff slide support ledges 95 should be located at a substantially equal height on the drop tube 93 in order that the ledges provide level support for the cutoff slide 98. The inner edges of the ledges 95 should be substantially parallel and should be separated by a distance greater than the circular opening 91 in slide retainer 99 in order to allow feed to drop freely down the tube.

The two slide retainer support ledges 96 should be located at a distance above the slide support ledges 95 to support the retainer 99 at a position which is sufficient to allow free horizontal movement of cutoff slide 98 between the slide support ledge 95 and the slide retainer 99. The retainer support ledges 96 should also be located at a distance below the cut-out for trough 108 substantially equal to the thickness of the slide retainer 99. The inner edge of the retainer support ledges 96 should be substantially parallel to each other, separated by distance slightly greater than the width of the cutoff slide 98 in order to allow free linear movement of the slide along the parallel edges.

In the preferred embodiment illustrated by FIGS. 7 and 8, the drop tube is comprised of a unitary piece of injection molded plastic, but it should be apparent to those of skill in the art that the drop tube and slide assembly could be formed of other suitable materials such as steel by welding or other suitable means.

The instant invention has been disclosed in connection with specific embodiments. However it will be apparent to those skilled in the art that variations from the illustrated embodiments may be undertaken without departing from the spirit and scope of the invention. For example, displacement of the cutoff slide members could be actuated by hydraulic, pneumatic or electric means instead of by means of a cable. As a further alternative, up to four closed loops could be designed to operate within the poultry house from a single feed source. Additionally, the shape of the trough could be varied to any variety of suitable shapes with a corresponding adaptation of the cutoff slide member and a corresponding variation of the conveying means. A further variation would include placing a cover on the trough along the length of the closed loop to protect the birds from the moving parts contained therein. These and other variations will be obvious to those skilled in the art and are within the spirit and scope of the invention.

What is claimed is:

1. An improved feed system for use with:
a feed source;
a closed-loop trough extending from adjacent the feed source through a feed area which includes a plurality of feed stations, the trough including sidewalls and a bottom floor;
conveying means for displacing feed from the feed source along the length of the trough throughout the feed area;
dispensing openings in the bottom floor of the trough overlying each of the feed stations; comprising the improvement of:
a plurality of axially displaceable closure means to be positioned underneath and adjacent the bottom floor of the trough at each of the dispensing openings to selectively and simultaneously cover and to selectively and simultaneously uncover each of the dispensing openings for
 (a) preventing the dispensing of feed from the trough to said stations while the conveyor distributes feed past the openings and throughout the trough in order to achieve an essentially uniform distribution of feed in the trough along the length of the closed loop, and
 (b) then dispensing essentially identical amounts of feed to said stations at the same time by uncovering the openings only after achieving the essentially uniform feed distribution along the trough;
means for each feed station for supporting each of the closures in position underneath the bottom floor of the trough and for guiding each closure for axial movement;
a cable to extend adjacent at least a section of the trough for having interconnected therewith a plurality of the axially displaceable closures;
means for biasing the cable in a direction to maintain each of the closures in a position preventing the dispensing of feed from the trough; and
power means for selectively displacing the cable in an axial direction opposed to the biasing direction to simultaneously open each of the closures interconnected with the cable.

2. The system as defined in claim 1, characterized further by the support means including a bracket including a generally horizontal floor, an L-shaped support tab on each lateral side of the floor, and an opening in the floor, each bracket being mounted beneath each trough opening such that the bracket opening and the trough opening are generally aligned, and by each closure being supported for axial movement by the L-shaped support tabs.

3. The system as defined in claim 1, characterized further by the closure means being integral with a pair of vertical sides which extend upwardly on the exterior of each trough side wall, and wherein the supporting means includes an inwardly turned flange integral with the top of each of said vertical sides, such that the flanges rest on the top of the trough.

4. The system as defined in claim 1, further including a unitary drop tube at each feeding station, the drop tube including (a) a floor positioned beneath the trough floor and having an opening in the drop tube floor in general alignment with the opening in the trough and (b) a tubular extension directed downwardly from the floor as positioned for use; and the floor including a pair of laterally spaced guide surfaces constituting said support and guide means for each respective closure.

5. The system as defined in claim 1, characterized by the
biasing means comprising at least one spring fixedly secured to said cable, and by
said power means comprising at least one solenoid in communication with said cable.

6. The system of claim 5 further comprising a microswitch positioned to close when the feed in the trough reaches the desired uniform level thereby actuating the movement of said element.

7. The system of claim 6, further comprising a time delay switch in communication with the microswitch and the solenoid to permit a selective period of time for depositing the feed before covering the dispensing openings.

8. In a method of depositing poultry feed at a plurality of feed stations within a poultry house, the steps of:
 (a) dispensing poultry feed into a trough from a feed source, the trough extending from the feed source through the poultry house in a closed loop to overlie a plurality of selectively positioned feed stations, with the trough having an opening therein at each of the feed stations;
 (b) conveying the poultry feed along the feed trough from the point of dispensing past the different feed stations without dispensing feed through the trough opening at those stations by covering the trough openings with respective gates, and achieving an essentially uniform distribution of feed in the trough along the length of the closed loop;
 (c) sensing the level of the poultry feed at a position adjacent the feed trough at the distant end of the closed loop trough when the poultry feed reaches a desired level;
 (d) after the completion of step (b) and in response to step (c), simultaneously, axially displacing each of the gates by at least one cable interconnected to a plurality of gates, and depositing essentially identical amounts of feed from the trough to the plurality of feed stations to provide simultaneous and uniform feed distribution throughout the poultry house, by conveying feed from positions between the openings to the openings for dispensing to the feed stations.

* * * * *